(12) United States Patent
Wu

(10) Patent No.: US 12,078,911 B2
(45) Date of Patent: Sep. 3, 2024

(54) OPTICAL PHASED ARRAY STRUCTURE AND FABRICATION TECHNIQUES

(71) Applicant: University of Rochester, Rochester, NY (US)

(72) Inventor: Hui Wu, Pittsford, NY (US)

(73) Assignee: UNIVERSITY OF ROCHESTER, Rochester, NY (US)

(*) Notice: Subject to any disclaimer, the term of this patent is extended or adjusted under 35 U.S.C. 154(b) by 245 days.

(21) Appl. No.: 17/754,358

(22) PCT Filed: Oct. 5, 2020

(86) PCT No.: PCT/US2020/054210
§ 371 (c)(1),
(2) Date: Mar. 30, 2022

(87) PCT Pub. No.: WO2021/067911
PCT Pub. Date: Apr. 8, 2021

(65) Prior Publication Data
US 2022/0334451 A1    Oct. 20, 2022

Related U.S. Application Data

(60) Provisional application No. 62/910,933, filed on Oct. 4, 2019.

(51) Int. Cl.
*G02F 1/295* (2006.01)
*G01S 7/481* (2006.01)

(52) U.S. Cl.
CPC .......... *G02F 1/2955* (2013.01); *G01S 7/4817* (2013.01); *G01S 7/4814* (2013.01); *G02F 2202/105* (2013.01)

(58) Field of Classification Search
CPC ............ G02F 1/2955; G02F 2202/105; G01S 7/4817; G01S 7/4814; G01S 7/4818; G01S 17/42
See application file for complete search history.

(56) References Cited

U.S. PATENT DOCUMENTS

2017/0299697 A1    10/2017  Swanson
2019/0056634 A1*    2/2019  Hosseini ................. G02F 1/292
2019/0235233 A1     8/2019  Russo et al.

OTHER PUBLICATIONS

International Search Report and Written Opinion of International Application No. PCT/US2020/054210.
Zhang, Y. et al., "High-Density Wafer-Scale 3-D Silicon-Photonic Integrated Circuits," in IEEE Journal of Selected Topics in Quantum Electronics, 2018, vol. 24, No. 6, pp. 1-10.
Guan, B. et al., "Hybrid 3D Photonic Integrated Circuit for Optical Phased Array Beam Steering", 2014 Conference on Lasers and Electro-Optics (CLEO)-Laser Science to Photonic Applications, 2015, pp. 1-2.

* cited by examiner

*Primary Examiner* — John Bedtelyon
(74) *Attorney, Agent, or Firm* — Ping Wang; Kalos Athena Wang PLLC

(57) ABSTRACT

Methods of manufacturing and operating a monolithically integrated optical phase array (OPA) chip device, and the device itself. A three-dimensional (3-D) integrated optical phase array (OPA) chip device. A system of complementary metal-oxide-semiconductor (CMOS) electronics integrated with a three-dimensional integrated optical array chip device. A method of three-dimension photonic integration to improve optical power in optical phase arrays.

19 Claims, 7 Drawing Sheets

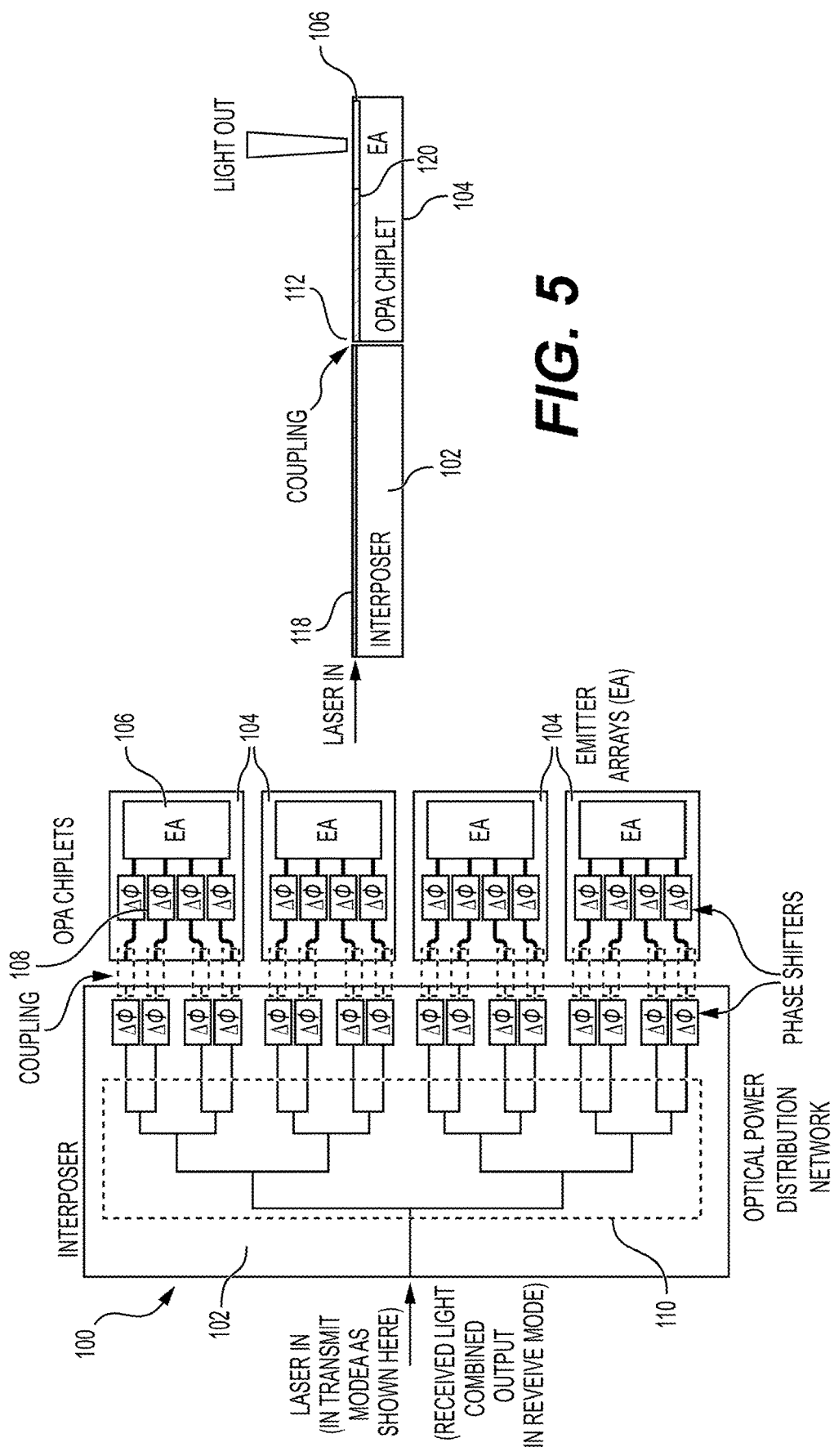

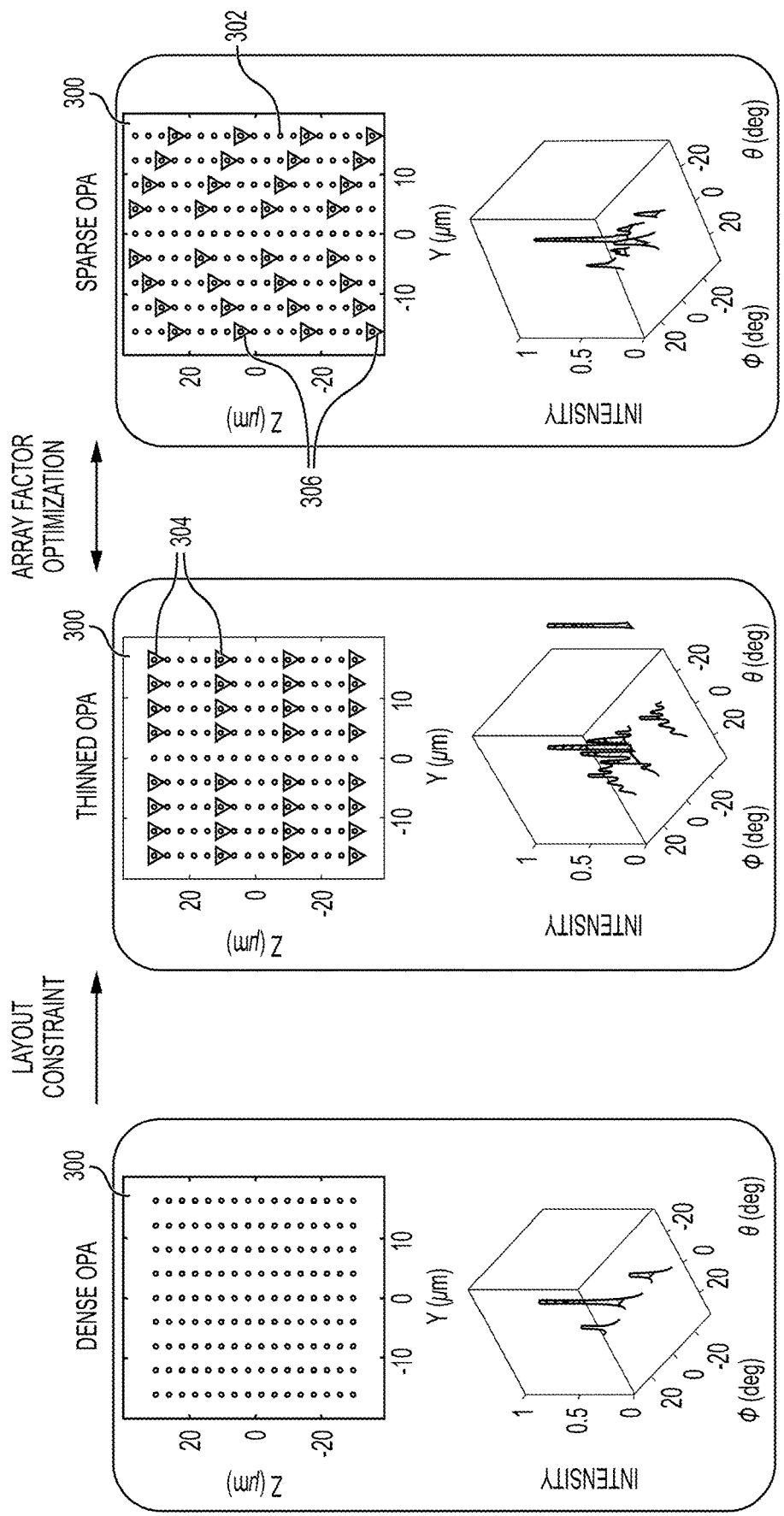

OPTICAL PHASED ARRAY STRUCTURE AND FABRICATION TECHNIQUES

RELATED APPLICATIONS

This application is a national stage application of International Patent Application No. PCT/US2020/054210, filed Oct. 5, 2020, which claims priority to U.S. provisional application No. 62/910,933, filed on Oct. 4, 2019, the contents of which are incorporated by reference in their entirety.

This invention was made with government support under U.S. Pat. No. 1,722,847 awarded by National Science Foundation. The government has certain rights in the invention.

FIELD

This application is related to the field of silicon photonics and optical phase array design.

BACKGROUND

Integrated optical phased arrays (OPAs) are rapidly becoming one of the most promising technologies for light detection and ranging (LIDAR) applications. This is in part due to their advantages in cost, size, weight, reliability, and power consumption as compared to conventional solutions. Large-scale OPAs can leverage high integration densities of electronic-photonic integrated circuit (EPIC) technology to generate finer beamwidth, and better beamsteering control.

To meet the stringent performance requirements in real world applications, OPAs need high output optical power, a large number of emitters with smaller pitch size, and a large aperture. New array architectures, aperture physical designs, and emitter geometries are being developed to relax the tradeoffs in OPA designs. Fundamentally, these limitations not only come from basic phased array characteristics, but also from the underlying integrated photonics technology's physical constraints.

Currently, silicon photonics technologies are the dominant technology choice for integrated OPA development. This is because of the low fabrication cost and electronic-photonic integration capabilities enabled by mature silicon based semiconductor infrastructures driven by CMOS electronics industry. Silicon offers low-loss optical waveguide devices for two main components of an OPA: the grating emitters and the phase shifters.

Silicon, however, may present some challenges in high-power, large-scale OPA implementations. First, silicon waveguides may have relatively low optical power handling capability due to the large loss at high optical power caused by two-photon absorption. Secondly, silicon photonic devices may be built on the top silicon layer of a silicon-on-insulator (SOI) chip. A single device layer may prohibit complex waveguide routing and severely limit how the array of emitters are connected to the phase shifters, especially for two-dimensional (2-D) OPAs. Extra routing space is needed inside the emitter array, which reduces the OPA's fill factor. Lastly, the SOI layer structure also limits the emission efficiency of the grating emitter since light can propagate both up off the chip or down into the substrate from the grating.

Further, 2-D OPAs continue scaling up to meet the performance requirements for real world applications. New array architectures, aperture optimization methodologies, and novel array geometries are needed to address fundamental tradeoffs for OPA's beamwidth and beamsteering performance. On one hand, the footprint of the emitter needs to be sufficiently large for reasonable emission efficiency. On the other hand, emitter pitch needs to be minimized so as to maximize the sidelobe spacing and hence beamsteering range. Therefore, the ratio between the emitter footprint and emitter pitch, also referred to as the fill factor, becomes an important design metric, similar to that in an image sensor.

Conventional phased array designs rely heavily on rectangular grid geometries due to their RF origin. Rectangular grids are desirable because mature analytic formulations for phased array analysis are readily available from the RF domain and can be scaled to optical frequencies. System-level array design and analysis is streamlined without the computational cost of directly modeling the full OPA on the device level. As the number of elements in the emitter array, and particularly the number of emitters, scales up, however, the rectangular grid design imposes some significant constraints on OPA performance. Because convention designs abstract the emitters as points on the rectangular grid, routing waveguides to the emitters is not often taken into account and left as an afterthought during the physical implementation (layout) of the array aperture. For one-dimensional (1-D) or small-scale 2-D arrays with fine emitter pitch, it is already difficult to route the waveguides due to the crosstalk between adjacent waveguides. For large-scale 2-D arrays, routing waveguides to emitters located at the array interior may become challenging.

SiN is an alternative material choice for silicon photonics. SiN waveguides may have lower loss and higher optical power handling capability than their silicon counterparts. Multiple SiN layers may be fabricated on a regular silicon substrate instead of the more expensive SOI one. Hence SiN photonic devices may be more fully compatible with standard CMOS technologies and may be integrated on the same chip with CMOS electronics. On the other hand, the thickness of a SiN thin film may be limited by mechanical stress to typically less than 200 nm. Since SiN may have much smaller refractive index than silicon (about 1.5 vs 3.4 at 1550 nm), optical confinement in SiN waveguides may be relatively poor. Hence, SiN may not be suitable for compact grating emitters, and also inefficient to implement thermal-optic phase shifters.

Moreover, many OPA based systems currently operate in one of three modes: pulsed, amplitude modulated continuous wave (AMCW), or frequency modulated continuous wave (FMCW). In the pulsed mode, the timing information is encoded and then decoded to and/or from its signal by pulses in the time domain, which is then translated into the target distance by the detection circuit in the receiver. In the AMCW or FMCW mode, the timing information is encoded and then decoded by a frequency sweep in either the RF modulation signal or the optical carrier signal. During each detection process, the OPA's optical beam is assumed to be directed at a given angular position with static coefficients at the OPA's phase shifters. To scan the target scene by beamsteering, the OPA's phase shifter coefficients need to be changed multiple times. At each new setting, the detection can begin when the phase shifter coefficients become stable after the transition. If thermo-optic phase shifters are employed, this transition can take some time to complete due the slow heat diffusion across the whole phase shifter array. This may be impractical for applications that require fast performance. Such slow transition not only slows down the beamsteering process, but also leads to larger power consumption since the heat dissipated to the environment during the transition is wasted.

There is a need for improved silicon photonic chips and optical phase array design. This application addresses that need.

SUMMARY

An aspect of the application is a three-dimensional (3-D) integrated optical phase array (OPA) device, comprising: an interposer, wherein the interposer comprising photonic waveguide layers are on top of a silicon substrate and having at least one optical input/output port; an optical power distribution network, wherein the optical power distribution network is located on the photonic waveguide layer of the interposer; and one or more OPA chiplets, wherein each OPA chiplet comprise phase shifters and photonic waveguides and having at least one optical input/output port; wherein the at least one optical input/output ports of the OPA chiplets are coupled to the at least one of the optical input/output ports of the interposer; wherein the one or more OPA chiplets comprise emitter arrays (EA), and wherein the OPA chiplet can operate in either transmit, receive, simplex, or duplex mode, wherein simplex mode means that the OPA chiplet can transmit or receive at different times, and duplex mode means that the OPA chiplet transmits and receives at the same time.

In certain embodiments, the device wherein OPA chiplets are 3-D integrated on an interposer with at least one photonic waveguide layer, wherein the photonic waveguide layer is separated from the silicon substrate layer or another photonic waveguide layer by at least one cladding material. In certain embodiments, the device wherein at least one photonic waveguide layer is fabricated on the silicon substrate and then patterned using lithography to become part of the interposer. In certain embodiments, the device wherein one or more waveguides on the one or more OPA chiplets feeds one or more sub-arrays of emitters, wherein each waveguide may feed a single emitter or a subarray of emitters. In certain embodiments, the device wherein the one or more OPA chiplets are integrated with the interposer by flip-chip bonding or multi-chip module technologies or other 3-D integration technologies. In certain embodiments, the device wherein a plurality of OPA chiplet are arranged in a column, and further wherein the OPA chiplets can be arranged in a 2-D array, wherein the 2-D array can comprise geometries including square, rectangle, circle, triangle, diamond, hexagonal, octagonal, or other shapes. In certain embodiments, the device wherein the EAs from all OPA chiplets form an overall OPA aperture for the device. In certain embodiments, the device wherein the optical distribution network comprises one or more selected from the group of waveguides, couplers, and passive devices to split an optical input from a laser source. In certain embodiments, the device wherein further comprising optical couplings that connects the interposer's optical input/output ports to the optical input/output ports on the one or more OPA chiplets. In certain embodiments, the device wherein the coupling is between one or more input/output ports on the interposer and one or more input/output ports on the OPA chiplets. In certain embodiments, the device wherein the coupling is structured as horizontal through edge-to-edge coupling. In certain embodiments, the device wherein the coupling is structured as vertical by mode conversion between a plurality of waveguides. In certain embodiments, the device wherein further comprising an emission window. In certain embodiments, the device wherein the emission window is opened within the interposer as one or more through-substrate openings in the region aligned with the EA on the one or more OPA chiplets. In certain embodiments, the device wherein the emission window is an opening at the backside of each OPA chiplets, wherein the opening can be patterned using etching or other fabrication techniques. In certain embodiments, the device wherein further comprising a reflector, wherein the reflector is a mirror made of a metal layer, or a grating, or other type of reflector, wherein the reflector may be on the interposer or on the OPA chiplet.

In certain embodiments, the OPA chiplet is built based on at least one of the following photonics technologies: silicon photonics (SiPh), silicon nitride photonics (SiN), hybrid silicon photonics (SiPh with SiN), lithium niobate photonics (LN), or III-V photonics. In certain embodiments, the photonic waveguide layer comprises at least one of silicon, silicon nitride, lithium niobate, or III-V materials. In certain embodiments, the OPA device is configured for multi-wavelength operation. In certain embodiments, the OPA device is configured for multi-beam operation.

Another aspect of the application is a method of building a three-dimensional integrated optical array chip device, comprising the steps of: building an optical power distribution network on at least one photonic waveguide layer; connecting one or more phase shifters to the optical power distribution network; coupling one or more OPA chiplets to the interposer; integrating the interposer with the one or more OPA chiplets; and wherein the one or more OPA chiplets comprise emitter arrays (EA) and phase shifters.

In certain embodiments, the method wherein the one or more OPA chiplets are integrated on top of the interposer. In certain embodiments, the method wherein at least one photonic waveguide layer is fabricated on top of the one or more OPA chiplets. In certain embodiments, the method wherein one or more waveguides on the one or more OPA chiplets feeds one or more sub-arrays of emitters. In certain embodiments, the method wherein the one or more OPA chiplets are flip-chip integrated on top of the interposer, or placed next to the interposer. In certain embodiments, the method wherein a plurality of OPA chiplets are arranged in a column. In certain embodiments, the method wherein the EAs from all OPA chiplets form an overall optical phase array aperture. In certain embodiments, the method wherein the optical distribution network comprises one or more selected from the group of waveguides, couplers, and passive devices to split an optical input from a laser source. In certain embodiments, the method wherein further comprising the step of: connecting the interposer's input/output ports to the input/output ports on the one or more OPA chiplets via optical couplings. In certain embodiments, the method wherein the coupling is between one or more output waveguides on the interposer and one or more input waveguides on the OPA chiplets. In certain embodiments, the method wherein the coupling is structured as horizontal through edge-to-edge coupling. In certain embodiments, the method wherein the coupling is structured as vertical by mode conversion between a plurality of tapered waveguides. In certain embodiments, the method wherein further comprising the step of: fabricating an emission window. In certain embodiments, the emission window is opened within the interposer as a through-substrate opening in the region aligned with the EA on the one or more OPA chiplets. In certain embodiments, the emission window is a backside opening patterned into each OPA chiplet, wherein the opening can be patterned using etching or other fabrication techniques. In certain embodiments, the method further comprises the step of: fabricating a reflector on the OPA chiplet or on the interposer. In certain embodiments, the OPA chiplet is built based on at least one of the following photonics technologies: silicon photonics (SiPh), silicon nitride photonics (SiN), hybrid silicon photonics (SiPh with SiN), lithium niobate photonics (LN), or III-V photonics. In certain embodiments, the photonic waveguide layer comprises at least one of silicon, silicon nitride, lithium niobate, or III-V materials.

Another aspect of the application is a method of improving emission efficiency of a front or back emitting OPA chiplet, comprising the steps of: positioning an emission window relative to an emission array, wherein the emission array is on an OPA chiplet, wherein front or back emitting light passes through the emission window from the emission array; positioning a reflector in relation to the emission array such that light propagated to the OPA chiplet substrate is reflected back to combine with the light emitted to free space.

In certain embodiments, the method wherein further comprising the step of: fabricating the device herein, wherein the device comprises the reflector positioned on the top surface of the OPA chiplet now facing downward as shown in figures herein. In certain embodiments, the method wherein further comprising the step of: fabricating the device herein, wherein the device comprises the reflector positioned on the interposer.

Another aspect of the application is a method of three-dimension vertical coupling to improve optical power in OPAs, comprising the steps of: positioning one or more emitters on an OPA chiplet on top of one or more photonic waveguides on the interposer to form a bus waveguide in a vertical coupling region of the device of above so that there is one waveguide on the interposer feeding multiple emitters, wherein light is coupled from the bus waveguide to the emitters in sequence or in other fashions, including coupling to emitters in parallel.

In certain embodiments, the method wherein the coupling region is the active device region for the phase shifter(s), wherein the phase shifter(s) may be a thermo-optic phase shifter(s). In certain embodiments, the method wherein further comprising the step of: positioning heaters near one or more waveguides for the phase shifters in the vertical coupling region, wherein the heaters are located on the interposer or on the OPA chiplet.

Another aspect of the application is a system of complementary metal-oxide-semiconductor (CMOS) electronics integrated with a three-dimensional integrated OPA device, comprising: the device herein; high-speed transceivers; signal processing; computer memory; and control circuitry.

Another aspect of the application is a method of manufacturing a two-dimensional sparse optical phase array by layout-constrained array factor optimization, comprising the steps of: determining the physical design constraints for a baseline array comprising emitters in a uniform geometric arrangement, wherein the physical design constraints comprise waveguide routing requirements of a two-dimensional optical phase array aperture, and wherein array factors considered include beamwidth, spaced grating lobes, steering range and sidelobes; allocating waveguide routing space within the physical design constraints by reducing fill factor among interior parts of the aperture, wherein the fill factor is the ratio between an emitter footprint and emitter pitch in the optical phase array; designing a thinned array of emitters in an arrangement determined by the allocation of waveguide routing space; designing a sparse array by re-designing the thinned array based on a far-field pattern analysis of the array factors; mapping the emitters to a non-uniform grid geometry within the physical design constraints, or wherein the geometry of grids is uniform or non-uniform grids with balanced patterns including square, circle or diamond.

In certain embodiments, the method wherein the non-uniform grid geometry is an asymmetric diagonal grid. In certain embodiments, the method wherein the geometry of grids is uniform or non-uniform grids with balanced patterns including square, circle, diamond or other geometries.

Another aspect of the application is a two-dimensional sparse optical phase array comprising: a plurality of emitters; and a plurality of waveguide routers; and wherein each of the plurality of emitters is connect to at least one of the plurality of waveguide routers and wherein the emitters are positioned to account for the physical constraints of the emitters and the waveguides.

In certain embodiments, the two-dimensional sparse optical phase array may have the emitters are positioned in a non-uniform grid geometry. In certain embodiments, the two-dimensional sparse optical phase array may have the emitters positioned in a balanced pattern. In certain embodiments, the two-dimensional sparse optical phase array may have the balanced pattern comprise one of a diagonal line, square, circle or diamond.

Another aspect of the application is a method of use of the device herein for multiple wavelength OPA operation, wherein multiple wavelengths can share the OPA and correspondingly multiple beams be transmitted/received at different angular directions.

In certain embodiments, the method wherein an OPA-based LIDAR generates multiple beams in different angular directions without using multiple emitters pointing at different angular directions.

Another aspect of the application is a 3-D integrated OPA device, comprising: an interposer, wherein the silicon substrate can be used to fabricate CMOS electronics, and wherein there are one or more photonic waveguide layers on the top; wherein an optical power distribution network is located on the photonic waveguide layer(s); wherein one or more phase shifters are connected to the optical power distribution network; one or more OPA chiplets, which are 3-D integrated on the interposer, wherein the interposer's input/output ports are coupled to the OPA chiplets, and wherein the one or more OPA chiplets comprise emitter arrays (EA) and phase shifters; and further wherein the interposer is integrated with the one or more OPA chiplets; and wherein the OPA chiplet can operate in either transmit, receive, or simplex/duplex mode, wherein simplex mode means that the OPA chiplet can transmit or receive at different times, and duplex mode means that the OPA chiplet transmits and receives at the same time.

In certain embodiments, the device wherein the one or more OPA chiplets are integrated on top of at least one photonic waveguide layer. In certain embodiments, the device wherein at least one photonic waveguide layer is integrated on top of the one or more OPA chiplets.

Another aspect of the application is a monolithically integrated optical phase array (OPA) device, comprising: an OPA chip; one or more EAs and phase shifters, wherein the one or more EAs and phase shifters are located on the OPA chip; CMOS electronics, wherein the CMOS electronics may be integrated on the OPA chip; two or more photonic waveguide layers, wherein the photonic waveguide layers are integrated on the OPA chip; and an optical power distribution network, wherein the optical power distribution network is located on one or more of the photonic waveguide layers and is connected to the phase shifters and EAs on the OPA chip.

One of ordinary skill will understand that the differing embodiments disclosed in this application can all be used either independently or in combination with each other and there is no limitation implied on such combinations by the order or manner in which embodiments are disclosed.

BRIEF DESCRIPTION OF THE DRAWINGS

While the present disclosure will now be described in detail, and it is done so in connection with the illustrative embodiments, it is not limited by the particular embodiments illustrated in the figures and the appended numbered paragraphs.

FIG. 4 illustrates an example of an optical phased array according to an embodiment of the present application.

FIG. 5 illustrates an example of an optical phased array with an emission window according to an embodiment of the present application.

FIG. 7 is a baseline array according to an embodiment of the present application.

FIG. 8 is a thinned array according to an embodiment of the present application.

FIG. 9 is a sparse array according to an embodiment of the present application.

DETAILED DESCRIPTION OF THE INVENTION

Reference will be made in detail to certain aspects and exemplary embodiments of the application, illustrating examples in the accompanying structures and figures. The aspects of the application will be described in conjunction with the exemplary embodiments, including methods, materials and examples, such description is non-limiting and the scope of the application is intended to encompass all equivalents, alternatives, and modifications, either generally known, or incorporated here. Unless otherwise defined, all technical and scientific terms used herein have the same meaning as commonly understood by one of ordinary skill in the art to which this application belongs. One of skill in the art will recognize many techniques and materials similar or equivalent to those described here, which could be used in the practice of the aspects and embodiments of the present application. The described aspects and embodiments of the application are not limited to the methods and materials described.

As used in this specification and the appended claims, the singular forms "a," "an" and "the" include plural referents unless the content clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to "the value," greater than or equal to the value" and possible ranges between values are also disclosed, as appropriately understood by the skilled artisan. For example, if the value "10" is disclosed the "less than or equal to 10" as well as "greater than or equal to 10" is also disclosed.

The present application is further illustrated by the following examples that should not be construed as limiting. The contents of all references, patents, and published patent applications cited throughout this application, as well as the Figures and Tables, are incorporated herein by reference.

EXAMPLES

Figure 1:
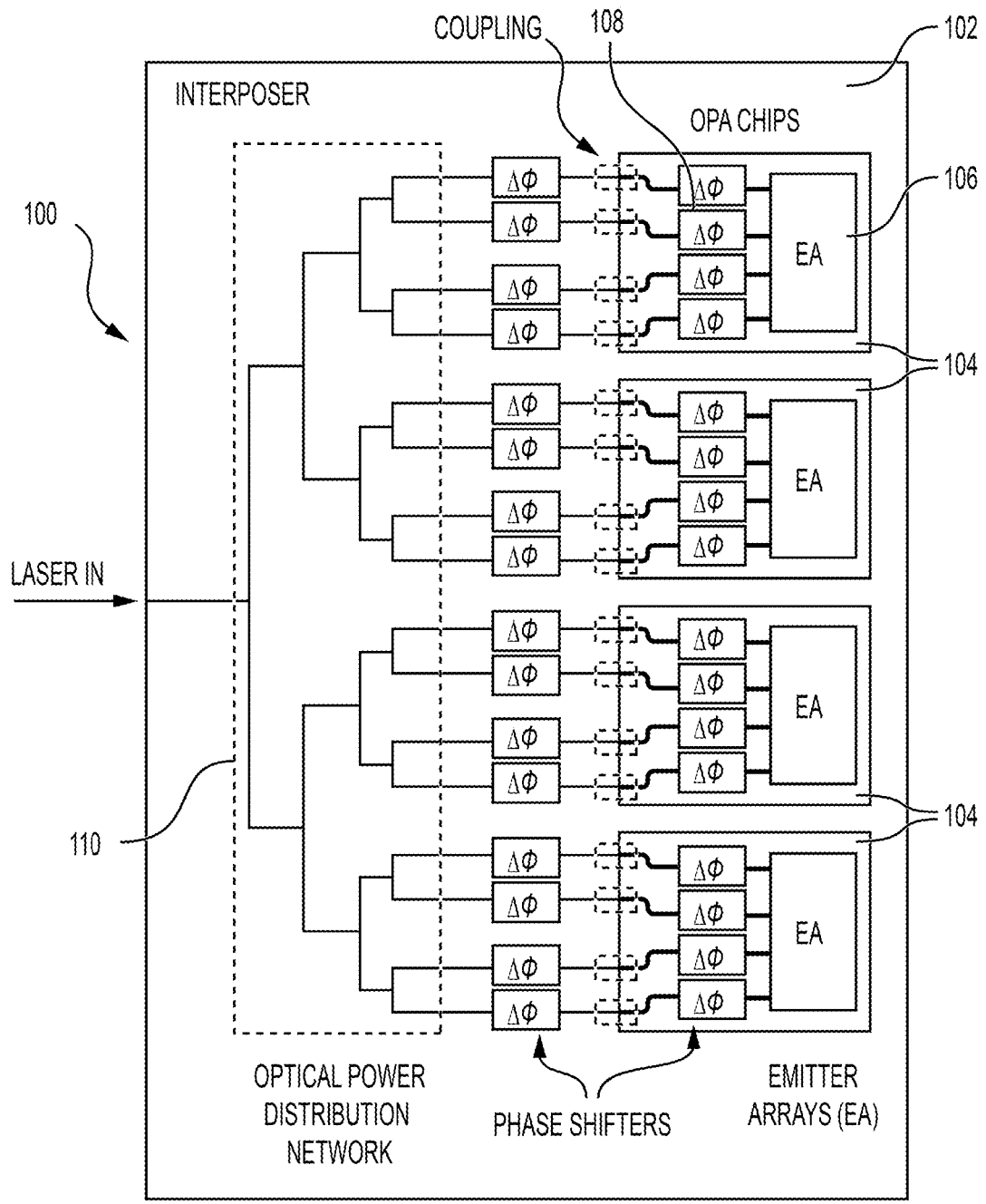
FIG. 1 illustrates an example of an optical phased array according to an embodiment of the present application.

The present application provides various embodiments as described below. One embodiment of the present application provides a three-dimensional (3-D) integrated optical phase array (OPA) design and supporting technologies. As shown in FIG. 1, the OPA device 100 is constructed as a 3-D integrated system with a photonic waveguide layer. This may include a SiN interposer 102 and M silicon-on-insulator (SOI) OPA chiplets 104, such as a silicon photonic (SiPh) chips, on top. While FIG. 1 shows four OPA chiplets 104, which may also be referred to as OPAs, may be on the SiN interposer 102, it is understood that more or fewer four OPA chiplets 104 may also be used. The embodiment allows a number of OPA chiplets 104 to be mounted on SiN interposer 102 as part of an overall system-on-chip (SoC). This 3-D structure of SiPh-on-SiN may also be implemented as SiN-on-SiPh where the technology allows SiN layers on top of the SiPh chip. Other embodiments and configurations may also be used.

Each of the OPA chiplets 104 may have optical input/output ports that are coupled to optical input/output ports an interposer 102. On the other side of the interposer 102, there may be one or more optical input/output ports to couple to (a) one or more fibers or lasers when the OPA chiplets 104 operate in the transmit mode, or (b) one or more fibers or photodetectors when the OPA chiplets 104 operate in the receive mode. Further, there may be phase shifter on the interposer 102. In addition, the OPA chiplets may be 3-D integrated on an interposer with at least one photonic waveguide layer. The photonic waveguide layer may be separated from the silicon substrate, or another photonic waveguide layer, by cladding materials.

The OPA chiplets 104 may be is built based on at least one of the following photonics technologies: silicon photonics (SiPh), silicon nitride photonics (SiN), hybrid silicon photonics (SiPh with SiN), lithium niobate photonics (LN), or III-V photonics The photonic waveguide layer comprises at least one of silicon, silicon nitride, lithium niobate, or III-V materials. Other materials may also be used. Further, an integrated waveguide may consists of two materials: a core material, and another cladding material surrounding it. Both may be dielectric materials. In the SiPh case, the core material may be silicon, and the cladding is $SiO_2$. In the SiN case, the core may be silicon nitride, and the cladding is still $SiO_2$. Other materials may also be used.

Each OPA chiplet 104 may consist of an array of emitters (EA) 106 and supporting phase shifters 108. While FIG. 1 illustrates one EA 106 on each OPA chiplet 104 and four supporting phase shifters 108 for each EA 106, it is understood that more or fewer EA's 106 and more or fewer supporting phase shifters 108 may also be used. There are N input waveguides on the OPA chiplet to N sub-arrays of emitters 106. The OPA chiplets 104 can be flip-chip integrated to the SiN interposer 102, as shown here. Alternatively, an OPA chiplet 104 may be placed face up, may sit next to the interposer, or sit in a cavity in the interposer. Then edge coupling is used to connect them. Other 3-D integration techniques may also be used. FIG. 1 illustrates an example of the layout of the 3-D integrated chip stack, in which the OPA chiplets 104 are positioned in a column. Other layout arrangements may be implemented as well.

By using the EAs 106 from many small OPA chiplets 104 to form the overall OPA aperture 100, the cost of OPA chiplet fabrication may be reduced. Additional cost saving may be achieved for the overall OPA system 100 as the chiplet design may improve the yield of the packaged 3-D chip by allowing the discarding of bad SiPh dies before 3-D integration. That is, each OPA chiplet 104 may be tested prior to integration with SiN interposer 102.

On the SiN interposer 102, there may be an optical power distribution network 110 made of waveguides, couplers (such as multi-mode interferometers or MMIs), and other passive devices to split the optical input from the laser source (not shown) to MxN outputs. In embodiments of the present application, portions of the optical power distribution network 110 may be off chip. There may also be phase shifters 108 on the SiN interposer 100 to set the bias across the outputs. These phase shifters 108 may be used to compensate for the phase variations on the SiN interposer chip 102 and across OPA chiplets 104. Other circuitry may also be included on and in connection with OPA 100.

By locating the optical power distribution network 110 on the SiN interposer 102, the power handling bottleneck of silicon waveguides may be reduced or eliminated. This may result in an increase in total optical power that may be output by the OPA 100. The 3-D chip stack structure may further allow complex waveguide routing underneath the OPA chiplets 104, resulting in finer emitter pitch, e.g., shorter distance between center-points of the emitters. Multiple SiN interposer layers 102 also may be implemented to further increase the routing density. The coupling region may consist of the waveguide couplers on both interposer and OPA chiplet, as well as any dielectric in between. FIGS. 1-5 illustrate the OPA operates in the transmit mode, i.e., "Laser in" and "Light out". When the OPA operates in the receive mode, the signals will be opposite, such that, for example, in FIG. 2, the "Laser In" label at the output waveguides 118 would be replaced by a "Light to Photodetector" label, and the "Light Out" label from the EA 106 would be replaced by a "Light Received." In an embodiment of application, the optical distribution network comprises one or more of waveguides, couplers, and passive devices such that when in receive mode, they function to split an optical input from laser source in the transmit mode, or to combine the light received from all OPA chiplets in the receive mode.

Figure 2:
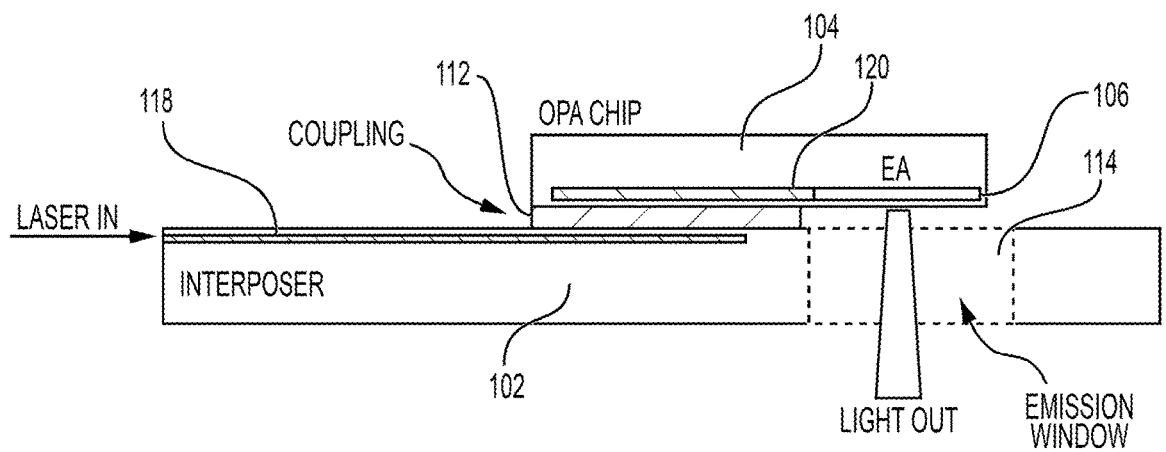
FIG. 2 illustrates an example of an optical phased array with an emission window opened on the SiN interposer according to an embodiment of the present application.
Figure 3:
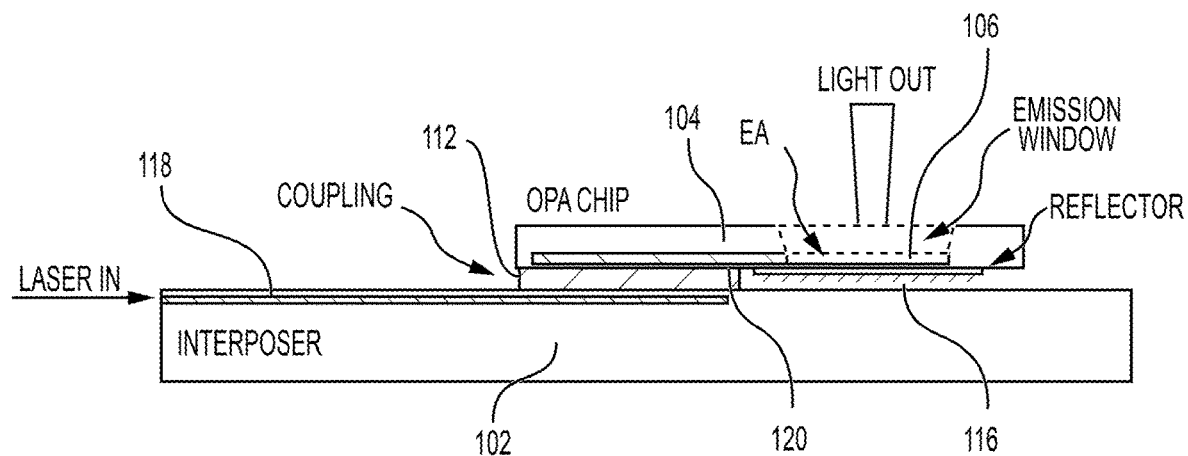
FIG. 3 illustrates an example of an optical phased array with an emission window opened on the SiN interposer according to an embodiment of the present application.

Optical coupling between the output waveguides 118 on the SiN interposer 102 and the input waveguides 120 on the OPA chiplets 104 may be performed in various manners. One such manner may be horizontal through end-to-end coupling, which is illustrated in FIGS. 2 and 3. In an embodiment of the application, a vertical coupling region 112 between the two chips may be made of a low index dielectric material, such as optical polymers, which also may serve as the underfill for the flip-chip integrating process. Other materials may also be used. In an embodiment of the application, there may be both silicon waveguide and SiN waveguide layers in the same chip. In such an embodiment, there may be two or more photonic waveguide layers: one for EA and phase shifters, and another (or more) for the optical power distribution network. While such an embodiment may be implemented using a hybrid SiPh+SiN technology, other technologies may also be used.

Another manner of optical coupling may be vertical by mode conversion between two tapered waveguides. Vertical coupling by mode conversion may result in high coupling efficiency, which in some instances may be close to 100%. Vertical coupling may also relax the alignment accuracy requirement between the two tapered waveguides. Other manners of vertical coupling may also be used.

The present application further provides different designs for the emission window, through which light is transmitted outward from the EA 106 to free space, or received from free space by the EA 104 when the OPA operates as a receiver. FIG. 2 illustrates one embodiment of the present application, where the emission window 114 is opened on the SiN interposer 102 as a through-substrate via (TSV) hole in the area facing the EA 106 on the OPA chiplets 104. As noted, a SiN waveguide 118 is provided on the photonic waveguide layer of SiN interposer 102, while a SiPh waveguide 120 is provided on the photonic waveguide layer of the OPA chiplets 104. Light leaves the EA 106 and travels through the emission window 114 of the SiN interposer 102.

FIG. 3 illustrates another embodiment of the present application of a design for the emission window 114, where the EA 106 operates in the back emission mode. A backside opening is etched into the silicon substrate of the OPA chiplets 104 to open the emission window for the EA. The backside etching process may be stopped by a buried oxide (BOX) layer, and may be similar to that for bulk silicon MEMS device. The emission window 114 therefore may be well controlled with clean boundaries defined by silicon crystal planes. To facilitate the etching process, the OPA chiplets 104 may be thinned down first. Other manners of fabricating the OPA chiplets 104 may also be used.

The emission efficiency of the back-emission EA 104 may also be improved by having a reflector 116 fabricated on a surface of the OPA chiplets 104. The OPA chiplets 104 may then be positioned such that the reflector 116 is located between the SiPh chip 104 and the SiN interposer 102. The reflector 116 may be of a metal, such as aluminum or silver. Other materials, including non-metal materials, may also be used for reflector 116.

Alternatively, the reflector 116 may be placed on the surface of the SiN interposer 102. By way of example, reflector 116 may be a mirror made of a metal layer, a grating, or other types of reflectors. The reflector 116 reflects the emitting light from the emitter back to the upward direction to be combined with the original back emitting light. When these two lights interfere constructively with the proper reflector distance, the emission efficiency may be improved compared to the top emitting only case. Emission efficiency may increase from less than 70% to over 95%. In addition, this back-emitting OPA design may be also applied to the OPA chiplet 104 alone in conventional technologies, independent of 3-D integration. Other configurations may also be used.

FIGS. 4 and 5 illustrate an example of an optical phased array according to an embodiment of the present application. Like components are identified with the same reference numbers as the embodiment of FIGS. 1-3. FIGS. 4 and 5 illustrate a 3-D integration scheme based on edge coupling between the interposer 102 and OPA chiplets 104. Thus, the embodiment of the present application may be slimmer, as the interposer and OPA chiplets 104 may be in the same plane.

According to the present application, additional integration schemes may potentially be more compact in which light is directly coupled from the SiN waveguide on the SiN interposer 102 vertically to multiple emitters in the EA 106 of the OPA chiplet 104. For example, the emitters in a row on the OPA chiplet 104 may be positioned on top of the SiN waveguide 118 in the coupling region, thereby allowing light to be coupled from the bus waveguide to these emitters in sequence. Since the optical mode expands gradually as light propagates in the bus waveguide, coupling coefficients may increase gradually between the bus waveguide and the emitters. This may effectively compensate for the decreasing optical power in the bus waveguide, and thus equalize the optical power coupled to each emitter. This may avoid the requirement of additional optical couplers between the bus waveguide and emitters. By utilizing the intrinsic characteristics of 3-D vertical coupling, the need for couplers to have different coupling coefficients to equalize the coupled power to each emitter may be reduced while also accurately controlling the nanometer gap size in fabrication.

The vertical coupling region may also be simultaneously used for thermo-optic phase shifters to save chip area. Some optical polymers may exhibit large thermo-optic coefficients, e.g., $do/dT=-1.3\times10^{-4}$ $K^{-1}$ for polymethyl methacrylate (PMMA), which is comparable in absolute value to that of silicon at 1550 nm. Heaters, such as resistive heaters, may be implemented on the SiN interposer 102 or SiPh chip 104 in the coupling region near the waveguides 118, 120 for these phase shifters 108. Other types of heaters may also be used.

Further, the polymer thermo-optic phase shifter design may be combined with the aforementioned scheme of direct vertical coupling co-emitters. In this embodiment, one or more heaters may be used to apply a phase shift to the entire coupling region and thus tune the phases of all the emitters in a linearly scaled fashion. Such a phase shifter design may be compact in chip area, energy efficient, and accurate in phase control.

CMOS electronics may be implemented on the SiN interposer 102 or on a separate chip also 3-D integrated on the SiN interposer 102. The 3-D chip stack may then become a complete electronic-photonic integrated system. High-speed transceivers, signal processing, memory, and control circuitry may be integrated with photonics to improve the performance, reduce energy, and enable new functionalities for the OPA system 100. Such a solid-state solution with no moving parts may exhibit improved performance in terms of cost, size, weight and reliability.

3-D OPAs according to embodiments of the present application may be used in LIDAR applications, due to their advantages in cost, size, weight, reliability, and power consumption as compared to conventional solutions. Large-scale OPAs can leverage high integration densities of electronic-photonic integrated circuit (EPIC) technology to generate finer beamwidth, and better beamsteering control.

To meet the stringent performance requirements in real world applications, embodiments of the present application may provide 3-D OPAs with higher output optical power, a larger number of emitters with smaller pitch size, and a larger aperture. The present application also works with silicon photonics technologies, which are a common technology choice for integrated OPA development because of the low fabrication cost and electronic-photonic integration capabilities enabled by mature silicon based semiconductor infrastructures driven by CMOS electronics industry. Silicon may offer low-loss optical waveguide devices for two main components of an OPA: grating emitters and phase shifters.

Embodiments of the present application may reduce or eliminate some of the issues with silicon in high-power, large-scale OPA implementations. The issues that may be improved or eliminated include silicon waveguides relatively low optical power handling capability due to the large loss of high optical power caused by two-photon absorption. Further, silicon photonic devices are often built on the top silicon layer of a silicon-on-insulator (SOI) chip. The present application may avoid single device layers that prohibit complex waveguide routing and may severely limit how the array of emitters are connected to the phase shifters, especially for 2-D OPAs. The present application may also improve the emission efficiency of the grating emitter.

Embodiments of the present application addresses these and other issues based on 3-D heterogeneous integration of both SOI and silicon nitride (SiN) photonics. By 3-D integration of both SOI and SiN photonics, the present application takes advantage of both technologies and achieve significant performance gains in high-power, large-scale OPAs.

Figure 6:
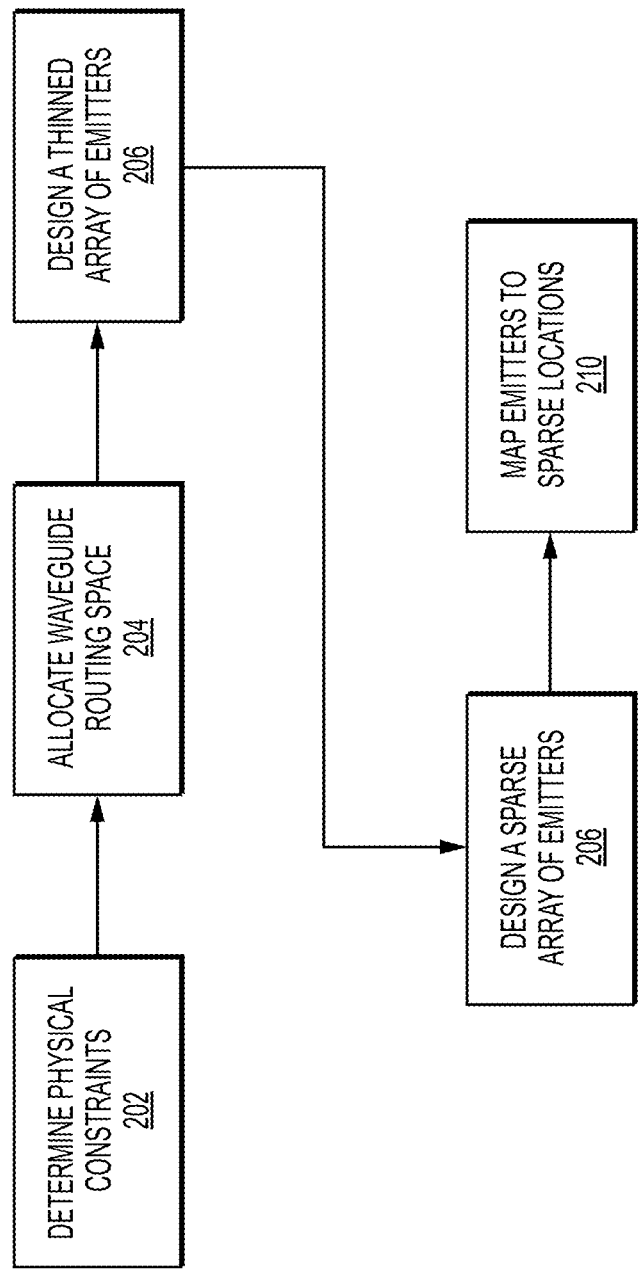
FIG. 6 is a flowchart illustrating steps of layout-constrained array factor optimization process according to an embodiment of the present application.

According to embodiments of the present application, a sparse OPA design based on layout-constrained array factor optimization (LCAFO) may be used in an OPA for various applications. LCAFO is a scalable design methodology to optimize 2-D OPAs. FIG. 6 illustrates how a LCAFO may be carried out. FIG. 7 illustrates a starting design of a 2-D OPA. The OPA 300 includes a number of emitters in starting positions 302. In this example, the original emitter starting positions 302 are located in rectangular shape of rows and columns. Any number of emitters in starting positions 302 may be used.

At step 202, the method may determine physical design constraints. At step 204, it may allocate waveguide routing space. At step 206, it may design a thinned array of emitters. At step 208, it may design a sparse array of emitters. At step 210, the emitters are mapped. The method of FIG. 4 will now be described in more details.

At step 202, the method may determine physical design constraints. Design constraints in the array implementation may include the waveguide routing requirements of a 2-D OPA aperture. This may include determining how much space is necessary for the waveguide routing for each emitter as well as the location and arrangement of that waveguide routing. Other constraints may also be determined and used in the design.

At step 204, the method may allocate waveguide routing space. This may include determining what space is necessary to connect waveguide to the emitters. It may also involve determining the location and arrangement of that waveguide routers. To satisfy the layout constraints, waveguide routing space may be allocated by reducing the fill factor among the interior parts of the aperture. In one example, the fill factor may be the ratio between an emitter footprint and emitter pitch in an optical array. This may result in a thinned array of emitters. An embodiment of the present application as shown in FIG. 8 illustrates the original rectangular pattern of emitters being divided into two halves of thinned emitter positions 304. It is understood that the entire rectangle of emitters can be manipulated. Alternatively, the rectangular pattern of emitters may be dived up into three or more sections for manipulation.

At step 206, the method may design a thinned array of emitters. The thinned array of emitters has fewer emitters than those in the original emitter configuration. Designing a thinned array may involve determine which emitters are kept and which emitters are eliminated, as the positions of the kept emitters. As shown in FIG. 8, the emitters are now located in the thinned positions 304. In this example, the thinned emitter positions are in rows. For reference, both the original positions 302 and the thinned positions 304 are shown to illustrate which emitters were removed in the example of the thinned design from step 206.

At step 208, the method may design a sparse array of emitters. In an example, the thinned array may re-designed and the thinned positions 304 may be mapped to a non-rectangular and potentially non-uniform grid geometry with the layout constraints based on far-field pattern analysis of the array factor. Thus, new sparse emitter positions 306 are determined based on a configuration that accounts for the physical design constraints, including the waveguide routing. For example, an asymmetric diagonal grid may be used. Other configurations may also be used.

At step 210, the emitters are mapped to the sparse positions 306. By way of example, FIG. 9 illustrates the emitters in the sparse positions 306 which are in two diagonal configurations that when put together form a bent configuration. However, the sparse emitter positions 306 may form other configurations, such as square, circle, diamond, triangle, or other arrangements, and either alone or together. Again, for reference, both the original positions 302 and the sparse positions 306 are shown to illustrate which emitters were removed in the sparse design from step 210.

FIGS. 7-9 further illustrate examples of the light intensities for each of the dense (or baseline), thinned and sparse emitter configurations. As illustrated, the intensity of the light from the sparse emitter configuration in FIG. 9 is substantially similar to that in the dense configuration in FIG. 7. Thus, the sparse configuration may be used in many of the same applications that a dense or baseline configuration could be used in.

Use of a LCAFO and the resulting sparse OPA design may have advantages, as waveguide routing is taken into account and hence more feasible for large scale arrays. Further, the fill factor may be much higher than a conventional sparse array design in a rectangular grid. In addition, a 2-D OPA designed using LCAFO may maintain some or all of the beamforming and beamsteering performance of a dense rectangular array. A design using LCAFP may be scalable to a larger size as well as compatible with advanced array architectures such as subarray designs. The solution space in LCAFO also may be significantly reduced, and the array may be systematically optimized to produce a scalable OPA. Further, the sparse array positions from the LCAFO method may be in well-defined locations. LCAFO methodology may also be compatible with subarray designs by maintaining the proximity of emitters in the same subarray. In addition, LCAFO may maintain the balanced subarray architecture to achieve higher total output optical power. Further, the LCAFO method may enable novel OPA designs with new functionalities, e.g., multiple beam generation by a single OPA. One of ordinary skill would understand that additional performance goals may be added into LCAFO designs.

As noted previously, the LCAFO method is illustrated conceptually in the example illustrated in FIGS. 7-9. The designs in the baseline (FIG. 7), thinned (FIG. 8), and sparse (FIG. 9) arrays show a typical design evolution using this method. The baseline array may have emitters on a dense rectangular grid, and exhibit ideal array factor properties, such as narrow beamwidth, far spaced grating lobes and hence large steering range, and weak side lobes. As noted, the high density of emitters may restrict waveguide routing area. A layout constraint may be imposed on the baseline array to allow waveguide routing. In this example, the waveguides may be routed from both sides of the array to the emitters, which essentially splits the array into two halves. In this example the constraint is applied by removing intermediate rows of the baseline array and thereby producing a thinned array in FIG. 8.

Each emitter in the thinned array illustrated in FIG. 8 may be directly fed with an optical waveguide. After thinning, however, the fill factor of the thinned array may be significantly reduced in the vertical dimension. This may introduce significant grating lobes in the array factor pattern or the thinned array in the θ direction. To recover the performance of the baseline array, the emitters in the thinned array may be re-mapped to a diagonal geometry grid as shown in FIG. 9. The array factor pattern shows a more even spread of grating lobe energy. Thus, the resulting sparse array design may exhibit a larger effective vertical till factor.

Figure 10:
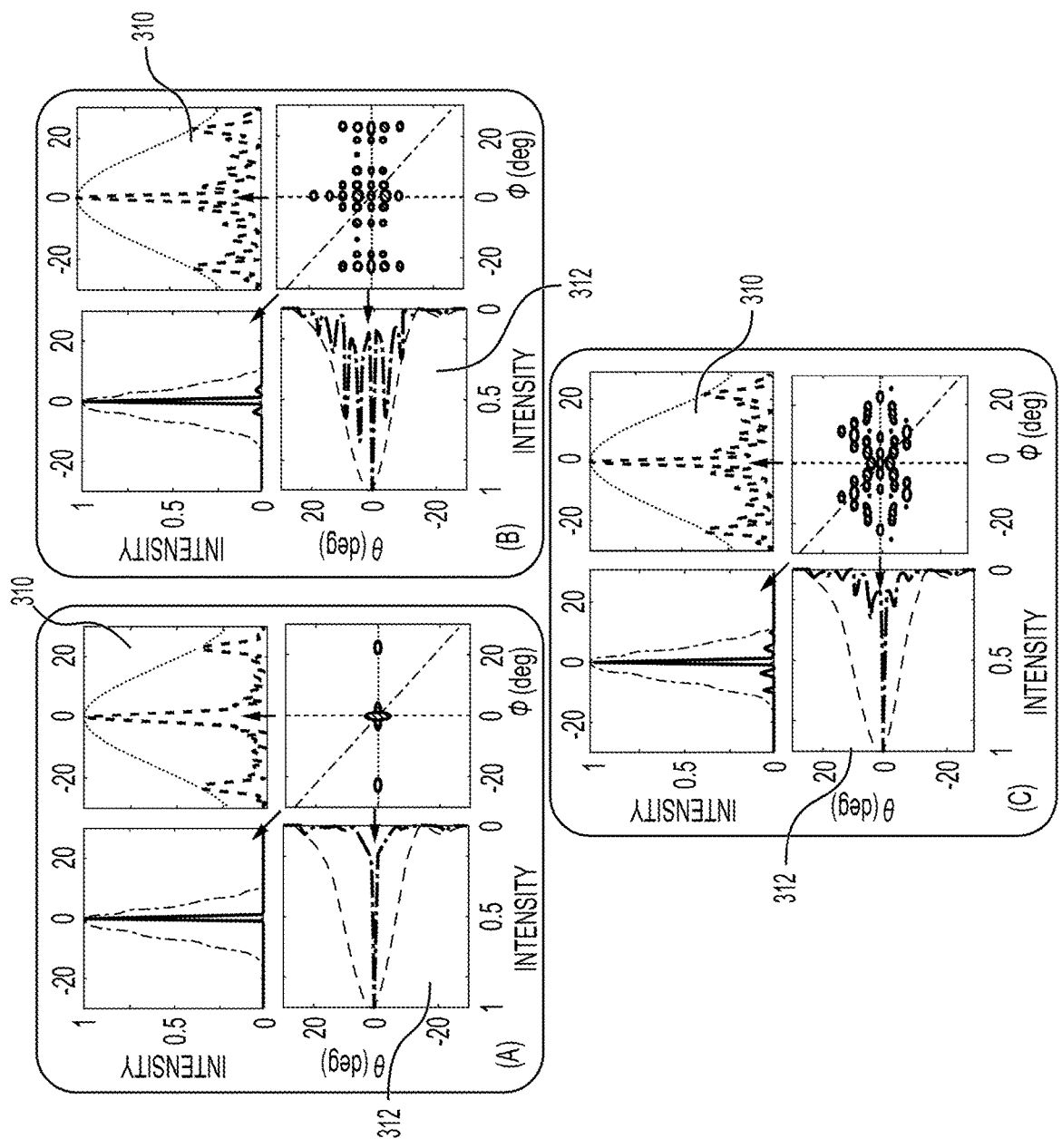
FIGS. 10(a)-(c) are total patterns for the baseline, thinned and sparse arrays according to an embodiment of the present application.

The total patterns of the baseline, thinned, and sparse arrays according to the present application are illustrated in FIGS. 10(a)-(c) respectively. Specifically, the intensity, phase and offset is show for each. These patterns are the product of the array factor (AF) and the far-field element pattern (EP) of a single emitter. As shown in the patterns in 310 in the ϕ-cuts 310, the total patterns may be similar since horizontal emitter density is maintained in all three arrays. Comparing the θ-cuts 312 of the total pattern, the large grating lobes in $TP_{Thinned}$ may be significantly reduced in $TP_{Sparse}$. The sparse array may achieve a good approximation of the orthogonal pattern properties of the baseline array with 5× reduction in emitters.

A non-uniform sparse array of emitters may be able to relax the design tradeoffs for large-scale 2-D OPAs. This will benefit the use of OPAs in LIDAR applications, as well as leverage high integration densities of electronic-photonic integrated circuit technologies to generate finer beamwidth and better beamsteering control. Sparse array emitters may increase the ability to scale up 2-D OPAs to meet the performance requirements for real world application. New array architectures, aperture optimization methodologies, and novel array geometries may be necessary to address tradeoffs for OPA's beamwidth and beamsteering performance.

In an embodiment of the present application, sparse array designs may be used in radio frequency (RF) phased array systems to alleviate the complexity and cost of large uniform arrays. In the RF domain, the goal of sparse array designs may be to reduce the fill factor of a uniform array by selectively removing emitters. In an optimized sparse array, the beamwidth of the uniform may be preserved with fewer emitters. This thinning procedure may be extended to the optical domain to create a sparse OPA. Since the aperture of a sparse OPA has fewer emitters than an equivalent uniform array, the available area for waveguide routing is increased. Further, crosstalk may be easier to manage in a sparse OPA.

The beam formed pattern of a sparse array aperture may be highly sensitive to the number and relative location of the emitters. There is no closed-form solution to guide the optimization of a sparse aperture. In an embodiment of the present application, a genetic algorithm of the present application may numerically emulate the evolutionary behaviors of DNA: mutation, crossover, and natural selection. When applied to sparse array optimization, the algorithm of the present application may treat each emitter as a switch and enforce constraints on beamwidth, sidelobe levels, emitter pitch, routing clearance, and emitter location. As noted previously, a sparse OPA design based on genetic algorithm may start from a reference array with a uniform rectangular grid within a fixed aperture. The optimized sparse array produced by the genetic algorithm may follow this uniform rectangular grid defined by the reference array. The genetic algorithm may optimize array performance without much consideration for the feasibility of implementation. The rectangular grid geometry may set an upper limit on the fill factor (density) of the optimized array aperture. Since beamforming and beamsteering performance of the array may be affected by the aperture fill factor, the rectangular array geometry may impose a limitation on array performance. A non-rectangular sparse array design may lead to improved OPA performance.

In another embodiment of the present application, during all or part of the beamsteering scan range, the coefficients of the OPA phase shifters may be changed in a consistent direction. For thermo-optic phase shifters, this means that the temperatures of the phase shifters may be either increased or decreased in the same direction. In one embodiment of an OPA beamsteering operation, the phase shifter coefficients are typically changed step by step, and at each step, the detection is performed after the transition so that the coefficients stabilize.

To speed up the beamsteering process, the transition of the phase shifter coefficient changes may be utilized for beamsteering. For thermo-optic phase shifters, their temperatures are increased (or decreased) linearly with time by controlling heater currents within heaters. During this transition when the temperatures ramp up (or down), the OPA's beam continuously scans across an angular range. An embodiment of the present application may include either slowing down the transition or adopting a fast detection mechanism in the receiver or both. In this embodiment, multiple detection samples may be taken during this transition, each at a separate angular position. The settling time for each detection may be reduced or essentially cut down to zero in such a continuous beamsteering operation of the OPA. Further, the temperature rise (or fall) may be predicted over time. This may allow the coefficient to be predicted and applied, thus reducing or eliminating the time needed for each step change to occur.

To generate the desired temperature ramp duration and linearity of thermo-optic phase shifters, heater currents are controlled in pre-defined waveforms, and monitored during the transition to correct any error by a feedback loop. The temperatures at each detection sample may be measured using temperature sensors embedded in the OPA chip, or derived from the heat currents. Other manners of measuring the temperature may also be used.

The OPA's phase shifter arrays may be optimized in the design by maximizing the spatial and time correlation of the phase shifter coefficients during the transition. For example, a single heater can generate a temperature gradient in a number of phase shifters, and the physical distances between them may determine the transition time for heat to transfer among them and hence the temperature ramp. Alternatively, a plurality of heaters may be used.

Optical variable phase shifters may be realized by exploiting the thermo-optic and electro-optic effect of silicon. In an embodiment of the present application, electro-optic may be preferred in peripheral interface controllers for high speed (GHZ) communications due to their fast response time (in ns), at the expense of large circuit footprint. However, in phased array applications, phase shifter footprint may take priority over modulation speed, especially in 2-D arrays. Heater devices may be made more compact (sub-$\lambda$) than their electrical counterpart. In 2-D phased arrays, slow (in $\mu$s) modulation by the thermo-optic effect may be tolerable with these compact heater devices as they enable the monolithic integration of both electronic and photonic devices on a single chip.

An optical phase shifter may control the phase of a propagating optical mode. The thermo-optic effect may be a simple and cost-effective technique to manipulate optical phase. A primary aspect in thermal phase shifter design may be thermal efficiency. Thermal efficiency may define the ability of the heater to convert electrical power to optical phase shift.

By introducing a heater into the optical path of a grating coupler, the propagating optical mode feeding the grating coupler can be delayed. This delay may not be particularly meaningful for a single grating coupler. However, if the grating coupler is part of an array, introducing a relative phase delay between adjacent grating couplers allows for direct control of the interference properties of the emitted light. By treating each grating coupler in the array as a radiating aperture, the far-field representation of the array may be a distribution of point sources, each emitting an electromagnetic wave. These electromagnetic waves interfere constructively and destructively. By thermo-optically inducing a constant phase delay between adjacent grating couplers, the constructive interference peak may be localized in a specific direction. Thus, the optical beam from the array of grating couplers may be steered in a controlled manner.

An array of grating couplers may require one or more heaters. A plurality of heaters may be arranged as an array of heaters. Whereas optical interference between adjacent grating couplers is desired and leveraged, thermal interference between adjacent heaters within an array of heaters may be undesirable. Large heater pitch may alleviate thermal crosstalk but increases the circuit footprint. Thus, an increase heater pitch may not be practical for hundreds to thousands of grating couplers. An alternative approach to limit thermal crosstalk in a compact footprint is to isolate adjacent heaters. For this technique to be feasible on a large scale, the isolation mechanism should not increase fabrication complexity. Etched air trenches between adjacent heaters may be a viable means of addressing the crosstalk challenge. However, the density of the heater array may set the upper limit on trench size, and the minimum aspect ratio of the fabrication process may set a lower limit on trench size. Therefore, the impact of isolating air trenches on heater thermal efficiency within practical fabrication margins must be considered.

Figure 11:
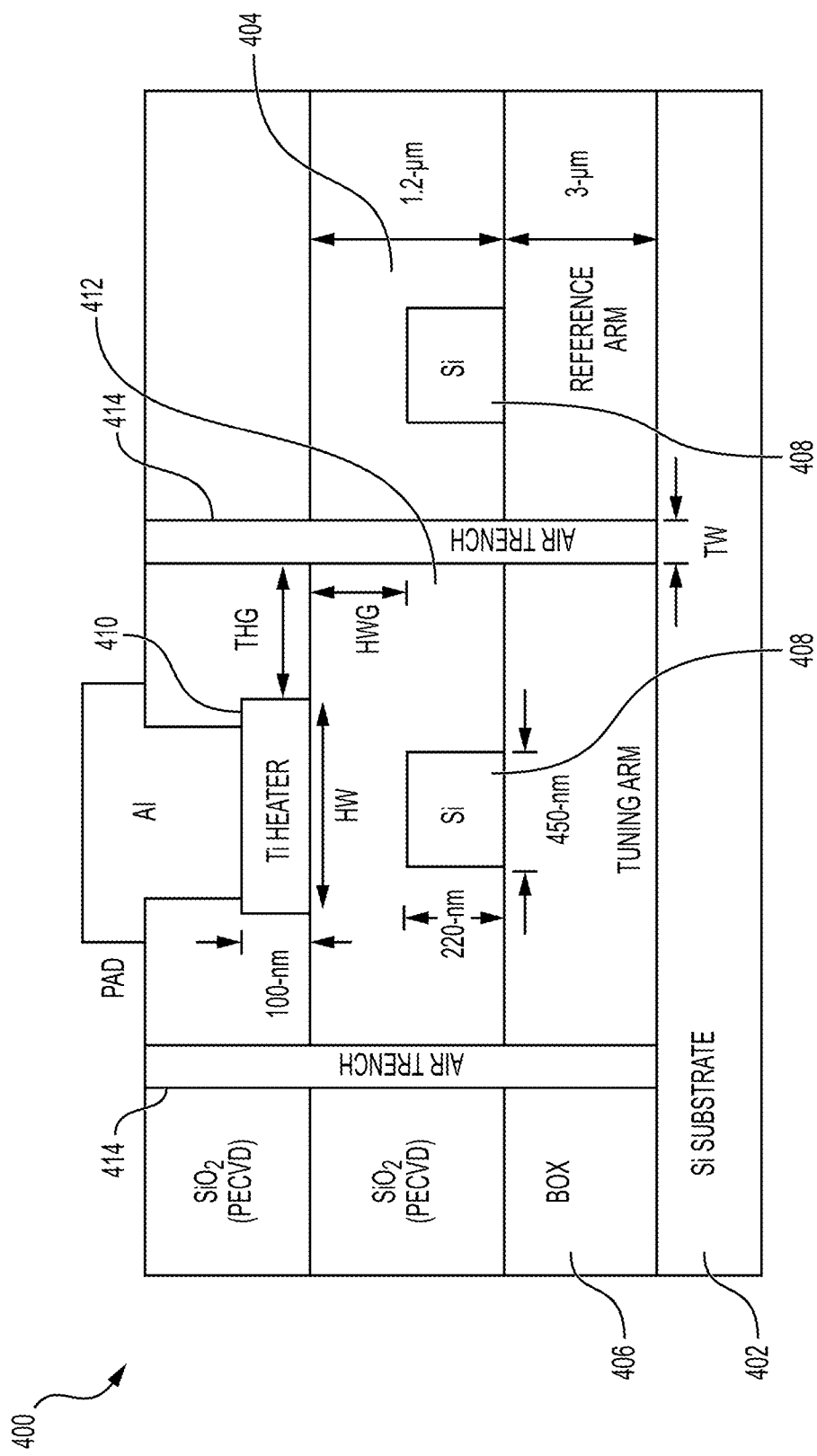
FIG. 11 illustrates a heater structure used in one of the phase shifter implementations in an OPA according to an embodiment of the present application.

FIG. 11 illustrates a heater geometry in an OPA according to an embodiment of the present application. As illustrated, a heater design may focus on the metal-over-waveguide heater geometry flanked by air trenches to enhance heat confinement. A cross-sectional view of the phase shifter 400 is shown in FIG. 11 with a standard silicon photonic technology based on a silicon-on-insulator (SOI) substrate 402 with a silicon top layer 404 and a buried oxide (BOX) layer 406. In an embodiment of the present application, the silicon layer 404 may be 220-nm and BOX layer 406 may be 3-μm thick. The phase shifter consists of a strip waveguide 408 and a titanium (Ti) resistive heater above it that is 110 nm thick. In an embodiment of the present application, the silicon layer 404 is formed into a strip waveguide 408 which may have dimensions of 220-nm×450-nm. $SiO_2$ cladding layers 412, and air trenches 414 may be etched on both sides of the strip waveguide 408. While various dimensions have been described for various elements, it is understood that other dimensions may be used. Various design parameters for the heater 410 may be consider. These parameters may include a vertical heater-to-waveguide gap (HWG), a horizontal trench-to-heater gap (THG), a trench width (TW), a heater width (HW), and a heater length (HL). In an embodiment of the present application, HWG may be a process parameter determined by the $SiO_2$ layer thickness below the Ti heater 410. The design parameters may be physical design parameters determined by the layout but are also bounded by the fabrication limitations (design rules).

In an embodiment of the present application, HWG and HW may be the dominant factors, as the closer the heater 410 is placed to the waveguide 408, the higher the thermal efficiency. In addition, the more concentrated the heat is generated, the better. The HWG may be lower bounded by the heater induced optical loss, while the HW may be lowered bounded by lithography and etching processes. Because of the linear relationships between heater power per unit length and temperature change (hence phase change), the heater length may barely affect the thermal efficiency. That is, the longer the heater length, the lower heater power per unit length, and the smaller the temperature change. Thus, the overall phase change may remain the same. The heater length may affect the heater's electrical resistance and hence the required voltage applied to the heater. In an embodiment of the present application, the maximum operation temperature and maximum control circuit voltage may set the lower and upper bounds of the heater length.

The thermal efficiency may be improved with the addition of air trenches 414. The generated heat may be confined within the thermal cavity and increase the thermal resistance. That is, heat generated in heater 410 may radiate to waveguide 408 and may not radiate as effectively through air trenches 414. A 67% reduction in thermal efficiency may be achieved for the same HWG, HW, and HL conditions when using an air trench 414. The performance may be further enhanced by optimizing the trench-to-heater gap (THG) in FIG. 9. For example, for HW=1 μm, HWG=0.2 μm, and HL=330 μm, an additional 50% reduction in thermal efficiency may be achieved when THG is reduced from 1.5 μm to 0.5 μm. In an embodiment of the present application, when THG is reduced to 100-nm, a thermal efficiency of 2.8-mW/π may be achieved. While an embodiment of one configuration is illustrated in FIG. 9, it is understood that other configurations may be used.

The various embodiments of the present application may be used alone or in combination with one or more other embodiments. Thus, as an example, the algorithm for the 2-D sparse OPA may be used in connection with the 3-D integrated optical phased array and the heater structure. Other combinations may also be used.

While various embodiments have been described below, it should be understood that such disclosures have been presented by way of example only and are not limiting. Thus, the breadth and scope of the subject compositions and methods should not be limited by any of the above-described exemplary embodiments, but should be defined only in accordance with the following claims and their equivalents.

The description herein is for the purpose of teaching the person of ordinary skill in the art how to practice the embodiments of the present application, and it is not intended to detail all those obvious modifications and variations of it which will become apparent to the skilled worker upon reading the description. It is intended, however, that all such obvious modifications and variations be included within the scope of the embodiments of the present application, which is defined by the following claims. The claims are intended to cover the components and steps in any sequence which is effective to meet the objectives there intended, unless the context specifically indicates the contrary.

What is claimed is:

1. A method of building a three-dimensional integrated optical array chip device, comprising the steps of:
    building an optical power distribution network on at least one photonic waveguide layer;
    connecting one or more phase shifters to the optical power distribution network;
    coupling one or more OPA chiplets to an interposer;
    integrating the interposer with the one or more OPA chiplets; and
    fabricating an emission window,
    wherein the one or more OPA chiplets comprise emitter arrays (EA) and phase shifters and wherein the emission window is opened within the interposer as a through-substrate opening in the region aligned with the EA on the one or more OPA chiplets.

2. The method of claim 1, wherein the one or more OPA chiplets are integrated on top of the interposer.

3. The method of claim 1, wherein at least one photonic waveguide layer is fabricated on top of the one or more OPA chiplets.

4. The method of claim 1, wherein one or more waveguides on the one or more OPA chiplets feeds one or more sub-arrays of emitters.

5. The method of claim 1, wherein the one or more OPA chiplets are flip-chip integrated on top of or placed next to the interposer.

6. The method of claim 1, wherein a plurality of OPA chiplets are arranged in a column.

7. The method of claim 1, wherein the EAs from all OPA chiplets form an overall optical phase array aperture.

8. The method of claim 1, wherein the optical distribution network comprises one or more selected from the group of waveguides, couplers, and passive devices to split an optical input from a laser source when the device operates in the transmit mode, or to combine the light received by all OPA chiplets when the device operates in the receive mode.

9. The method of claim 1, further comprising the step of:
    connecting the interposers input/output ports to the input/output ports of the one or more OPA chiplets via an optical coupling.

10. The method of claim 9, wherein the coupling is between one or more output waveguides on the photonic waveguide layer and one or more input waveguides on the OPA chiplets.

11. The method of claim 10, wherein the coupling is structured as horizontal through edge-to-edge coupling.

12. The method of claim 10, wherein the coupling is structured as vertical by mode conversion between a plurality of tapered waveguides.

13. The method of claim 1, further comprising the step of: fabricating a reflector on the OPA chiplet or on the interposer.

14. The method of claim 1, wherein the OPA chiplet is built based on at least one of the following photonics technologies: silicon photonics (SiPh), silicon nitride photonics (SiN), hybrid silicon photonics (SiPh with SiN), lithium niobate photonics (LN), or III-V photonics.

15. The method of claim 1, wherein the photonic waveguide layer comprises at least one of silicon, silicon nitride, lithium niobate, or III-V materials.

16. A method of building a three-dimensional integrated optical array chip device, comprising the steps of:
building an optical power distribution network on at least one photonic waveguide layer;
connecting one or more phase shifters to the optical power distribution network; coupling one or more OPA chiplets to an interposer; and
integrating the interposer with the one or more OPA chiplets;
wherein the one or more OPA chiplets comprise emitter arrays (EA) and phase shifters;
wherein the one or more OPA chiplets are integrated on top of the interposer; and
wherein at least one photonic waveguide layer is fabricated on top of the one or more OPA chiplets;
wherein one or more waveguides on the one or more OPA chiplets feeds one or more sub-arrays of emitters; and wherein the one or more OPA chiplets are flip-chip integrated on top of or placed next to the interposer, wherein a plurality of OPA chiplets are arranged in a column;
wherein the EAs from all OPA chiplets form an overall optical phase array aperture;
wherein the optical distribution network comprises one or more selected from the group of waveguides, couplers, and passive devices to split an optical input from a laser source when the device operates in the transmit mode, or to combine the light received by all OPA chiplets when the device operates in the receive mode;
and wherein the method further comprises the step of:
connecting input/output ports of the interposer to input/output ports of the one or more OPA chiplets via an optical coupling; and
fabricating an emission window, wherein the emission window is opened within the interposer as a through-substrate opening in the region aligned with the EA on the one or more OPA chiplets.

17. The method of claim 16, further comprising the step of: fabricating a reflector on the OPA chiplet or on the interposer.

18. A method of building a three-dimensional integrated optical array chip device, comprising the steps of:
building an optical power distribution network on at least one photonic waveguide layer;
connecting one or more phase shifters to the optical power distribution network;
coupling one or more OPA chiplets to an interposer;
integrating the interposer with the one or more OPA chiplets; and
fabricating an emission window,
wherein the one or more OPA chiplets comprise emitter arrays (EA) and phase shifters and wherein the emission window is a backside opening patterned into each OPA chiplet, wherein the opening can be patterned using etching or other fabrication techniques.

19. The method of claim 18, further comprising the step of: fabricating a reflector on the OPA chiplet or on the interposer.

* * * * *